(12) United States Patent
Wakai

(10) Patent No.: US 10,859,110 B2
(45) Date of Patent: Dec. 8, 2020

(54) HOLDER OF A FASTENER

(71) Applicant: WAKAI HOLDINGS CO., LTD., Osaka (JP)

(72) Inventor: Takemasa Wakai, Osaka (JP)

(73) Assignee: WAKAI HOLDINGS CO., LTD., Osaka (JP)

( * ) Notice: Subject to any disclaimer, the term of this patent is extended or adjusted under 35 U.S.C. 154(b) by 255 days.

(21) Appl. No.: 15/997,137

(22) Filed: Jun. 4, 2018

(65) Prior Publication Data

US 2019/0093694 A1 Mar. 28, 2019

(30) Foreign Application Priority Data

Sep. 25, 2017 (JP) .................................. 2017-184072

(51) Int. Cl.
*F16B 21/00* (2006.01)
*F16B 37/04* (2006.01)

(52) U.S. Cl.
CPC .................................. *F16B 37/044* (2013.01)

(58) Field of Classification Search
CPC .................................................... F16B 37/044
USPC .......................................................... 411/340
See application file for complete search history.

(56) References Cited

U.S. PATENT DOCUMENTS

| 978,380 | A | * | 12/1910 | Kennedy | |
|---|---|---|---|---|---|
| 2,678,075 | A | * | 5/1954 | Murphy | F16B 37/044 411/113 |
| 4,439,079 | A | * | 3/1984 | Losada | F16B 13/0808 24/16 PB |
| 2001/0010791 | A1 | | 8/2001 | Ikuta | |
| 2002/0154965 | A1 | | 10/2002 | Ikuta | |

FOREIGN PATENT DOCUMENTS

| JP | 2001-280323 | 10/2001 |
|---|---|---|
| JP | 2002-317807 | 10/2002 |

* cited by examiner

*Primary Examiner* — Gary W Estremsky
(74) *Attorney, Agent, or Firm* — Wenderoth, Lind & Ponack, L.L.P.

(57) ABSTRACT

A holder is provided to be used with a fastener that includes a pivot nut. The holder includes a flange plate, and a pair of substantially U-shaped arm plates disposed on respective opposite sides of the flange plate. The arm plates hold the pivot nut so that the pivot nut is pivotable and movable relative to the flange plate. The flange plate has a threaded member insertion hole through which a threaded member is inserted. The two arm plates are arranged at different distances from the center axis of the threaded member insertion hole.

11 Claims, 8 Drawing Sheets

HOLDER OF A FASTENER

CROSS REFERENCE TO RELATED APPLICATIONS

This application is based on and claims priority under 35 U.S.C. sctn. 119 with respect to Japanese Patent Application No. 2017-184072 filed on Sep. 25, 2017, the entire content of which is incorporated herein by reference.

BACKGROUND OF THE INVENTION

The present invention relates to a holder which is a main component of a fastener used to fix various articles to a wall arranged such that the area behind the wall is inaccessible to human hands, with a threaded member.

Such a faster includes, as disclosed in JP Patent Publications 2001-280323A and 2002-317807A, a substantially U-shaped holder including a flange plate having a threaded member insertion hole, and a pair of arm plates on both sides of the flange plate; and a pivot nut retained between the arm plates. The pivot nut is a rectangular member having a threaded hole located in its central portion and extending therethrough in its thickness direction, and a nut pivoting inclined surface at one end of one side of the pivot nut, the nut pivoting inclined surface being configured be pushed by the tip of a threaded member. The pivot nut further includes pivot shafts on the respective side surfaces thereof.

The pivot nut is received between the arm plates of the holder with the pivot shafts supported in elongated holes each formed in the respective arm plate to extend in the longitudinal direction thereof such that the pivot nut is pivotable about the pivot shafts and movable toward and away from the flange plate in the elongated direction of the elongated holes. In particular, the pivot nut is pivotable between a position where the longitudinal direction of the pivot nut coincides with the longitudinal direction of the arm plates, and a position where the longitudinal direction of the pivot nut is perpendicular to the longitudinal direction of the arm plates.

In order to fix an article to a wall using such a fastener, with the pivot nut positioned at the distal ends of the arm plates such that its longitudinal direction coincides with the longitudinal direction of the arm plates, the pivot nut and the arm plates are inserted into a hole formed in the wall beforehand until the flange plate of the holder abuts the front surface of the wall. In this state, when a threaded member, which has been inserted through the article, is inserted through the threaded member inserting hole into the holder, the tip of the threaded member pushes the nut pivoting inclined surface of the pivot nut to pivot the pivot nut until the its longitudinal direction becomes perpendicular to the longitudinal direction of the arm plates, and the center axis of the threaded member coincides with the center axis of the threaded hole of the pivot nut.

In this state, when the threaded member is turned while pushing it, the threaded member is screwed into the threaded hole of the pivot nut, as a result of which the pivot nut is moved toward the wall, so that the article is pressed against and fastened to the wall by the pivot nut and the head of the threaded member.

The holder of such a fastener is formed by stamping and bending a thin metal plate. From an economical viewpoint, the pivot nut is formed by die-casting using a metal.

A conventional such holder includes a substantially rectangular flange plate having a circular threaded member insertion hole at its center, and two arm plates extending from the respective long sides of the flange plate toward the back surface of the flange plate at a right angle relative to the flange plate so as to face each other with the center axis of the threaded member insertion hole disposed between the arm plates, each arm plates having an elongated hole elongated in the longitudinal direction of the arm plate, for holding the pivot nut.

The pivot nut has protruding shafts on the respective side surfaces thereof, and is received between the two arm plates with the protruding shafts fitted with slight play in the respective elongated holes, so that the pivot nut is held by the holder so as to be pivotable about the protruding shafts and movable in the elongated direction of the elongated holes.

The threaded member insertion hole of the flange plate has a larger diameter than the major diameter of the threaded member to be screwed into the threaded hole of the pivot nut so that the threaded member can be smoothly inserted through the threaded member insertion hole. The arm plates, which are disposed on both sides of the flange plate so as to face each other with the center axis of the threaded member insertion hole, are spaced apart the same distance from the center axis of the threaded member insertion hole so that, when the pivot nut pivots to face the flange plate while being located at the distal ends of the arm plates, the threaded member insertion hole becomes substantially coaxial with the threaded hole. This makes it possible to screw the threaded member into the threaded hole while being inserted through the threaded member.

Since the above-described conventional fastener is configured such that, when the pivot nut is pushed and pivoted by the threaded member to face the flange plate while being located at the distal ends of the arm plates, the threaded member insertion hole becomes substantially coaxial with the threaded hole, when the pivot nut is pushed by the threaded member, and when the threaded member is screwed into the threaded hole, the threaded member does not directly contact the holder, so that the pushing force and the screwing force applied to the threaded member directly act on the pivot nut.

Since the pivot nut is held with slight play by the holder, the pushing force or screwing force applied to the threaded member tends to cause wobbling movement of the pivot shaft in the initial stage before the threaded member is brought into threaded engagement with the threaded hole, so that due to the wobbling movement of the pivot nut, the threaded member tends to expand the threaded hole. If the pushing force and the screwing force directly act on the pivot nut, the threaded hole is expanded with a strong force. This could result in the pivot nut, which is formed by die casting and low in strength, being cracked starting from the threaded hole, or breakage of the internal thread of the threaded hole.

Also, since this conventional fastener is configured such that the pushing force applied to the threaded member directly act on the pivot nut, a large pushing force applied to the threaded member by an operator will increase the possibility of cracking of the pivot nut or breakage of the internal thread.

SUMMARY OF THE INVENTION

An object of the present invention is to reduce wobbling movement of the pivot nut caused by the threaded member, and to prevent the pushing force applied to the threaded member from directly acting on the pivot by configuring the holder of the fastener such that the threaded member engages a portion of the holder while the threaded member is being inserted into the holder and screwed into the pivot nut, thereby preventing cracking of the pivot nut and breakage of the internal thread of the threaded hole of the pivot nut.

In order to achieve this object, the present invention provides a holder of a fastener, the holder comprising: a flange plate having a threaded member insertion hole having a center axis; and a pair of arm plates on respective two sides of the flange plate, the arm plates being opposed to each other with the center axis of the threaded member insertion hole disposed between the arm plates; wherein the holder is configured to constitute the fastener in cooperation with a pivot nut retained by the holder so as to be pivotable and movable toward and away from the flange plate, between the arm plates; and wherein the distance between the center axis of the threaded member insertion hole and one of the arm plates is different from the distance between the center axis of the threaded member insertion hole and the other arm plate.

In one preferred arrangement, the arm plates are bent from the flange plate toward a back surface of the flange plate, the flange plate being a metal plate, and having peripheral walls disposed on the back surface of the flange plate to extend along a peripheral edge of the threaded member insertion hole, the peripheral walls being separated from each other by spaces opposed to the respective arm plates, and portions of the peripheral edge of the threaded member insertion hole in the respective spaces have a thickness equal to the thickness of the flange plate.

In an alternative arrangement, the pivot nut has a threaded hole having a center axis, and the holder is configured such that the arm plates are inclinable relative to the pivot nut in directions in which the arm plates are opposed to each other such that the flange plate is movable in a direction in which the center axis of the threaded member insertion hole of the flange plate coincides with the center axis of the threaded hole of the pivot nut.

In a further alternative arrangement, the fastener further includes a threaded member having a thread, the threaded member being configured to be screwed into the pivot nut, and the flange plate is a metal plate having a thickness not more than a pitch of the thread of the threaded member.

Thus, the holder is configured such that, when the pivot nut faces the flange plate while being held between the arm plates of the holder at the distal ends of the arm plates, the center axis of threaded member insertion hole of the flange plate of the holder is offset from the center axis of the threaded hole of the pivot nut by the distance equal to the distance by which the center axis of the threaded member insertion hole is offset toward one of the arm plates. Therefore, the threaded member is inclined toward the one of the arm plates until its tip enters the threaded hole. However, once the tip of the threaded member enters the threaded hole, the threaded member receives a force that tends to cause the threaded member to become coaxial with the threaded hole, i.e., tends to pivot the threaded member toward the other arm plate until it becomes parallel to the arm plates. As a result, an intermediate portion of the thread on the threaded member engages a portion of peripheral edge of the threaded member insertion hole opposed to the other arm plate.

Since the pushing force applied to the threaded member is partially received by the portion of the holder engaging the threaded member, the pushing force applied to the pivot nut decreases, and simultaneously, the engagement of the threaded member with the holder, prevents movements of the threaded member and the pivot nut relative to the holder, thus preventing wobbling movement of the pivot nut.

When the threaded member is turned in the screwing direction after the tip of the threaded member enters the threaded shaft, the threaded member pushes the flange plate of the holder in the direction opposite to the direction in which the threaded member insertion hole is offset, while deflecting the arm plates, so that the threaded member can be screwed into the threaded hole until the threaded member insertion hole becomes coaxial with the threaded hole. When the threaded member is further turned in the screwing direction with the head of the threaded member abutting the article, the pivot nut is moved toward the wall until it abuts the back surface of the wall. The article can thus be pressed against and fixed to the wall by the head of the threaded member and the pivot nut.

According to the present invention, since the pair of arm plates on both sides of the flange plate are arranged at different distances from the center axis of the threaded member insertion hole, it is possible to engage an intermediate portion of the thread on the threaded member with the flange plate of the holder while the threaded member is being screwed into the threaded hole, thus preventing movements of the threaded member and the pivot relative to the holder. This prevents wobbling movements of the pivot nut, and thus prevents cracks of the pivot nut, starting from the threaded hole, and breakage of the internal thread on the inner periphery if the threaded hole.

The engagement of an intermediate portion of the thread on the threaded member with the flange plate of the holder reduce the pushing force applied to the pivot nut from the threaded member, thereby preventing excessive pushing force from acting on the pivot nut from the threaded member. This prevents breakage of the pivot nut.

DETAILED DESCRIPTION OF THE PREFERRED EMBODIMENTS

The embodiment of the present invention is now described with reference to the accompanying drawings.

Figure 1:
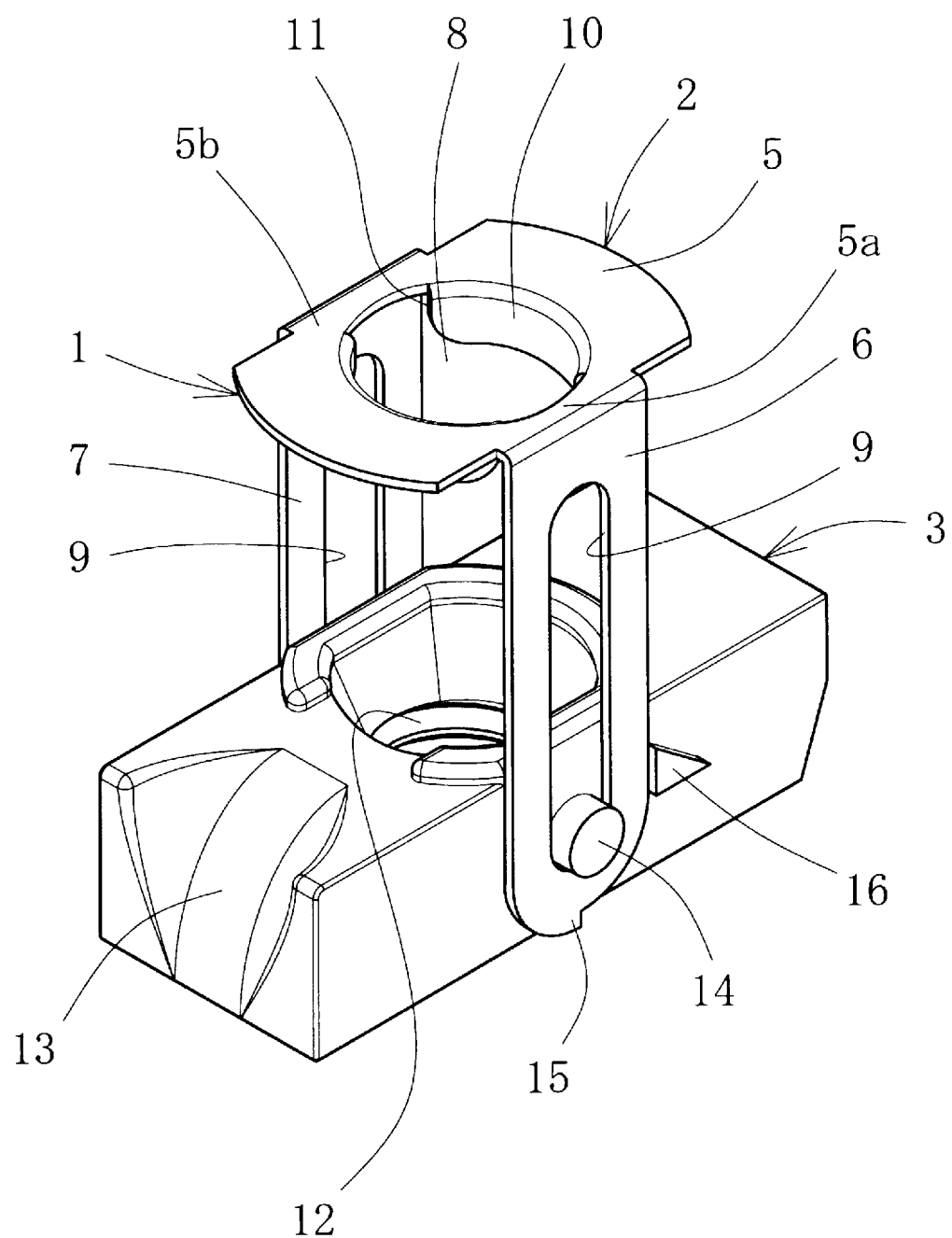
FIG. 1 is a perspective view of a fastener including a holder according to the present invention, showing the state in which a pivot nut has pivoted to a position where the pivot nut faces a flange plate.
Figure 7:
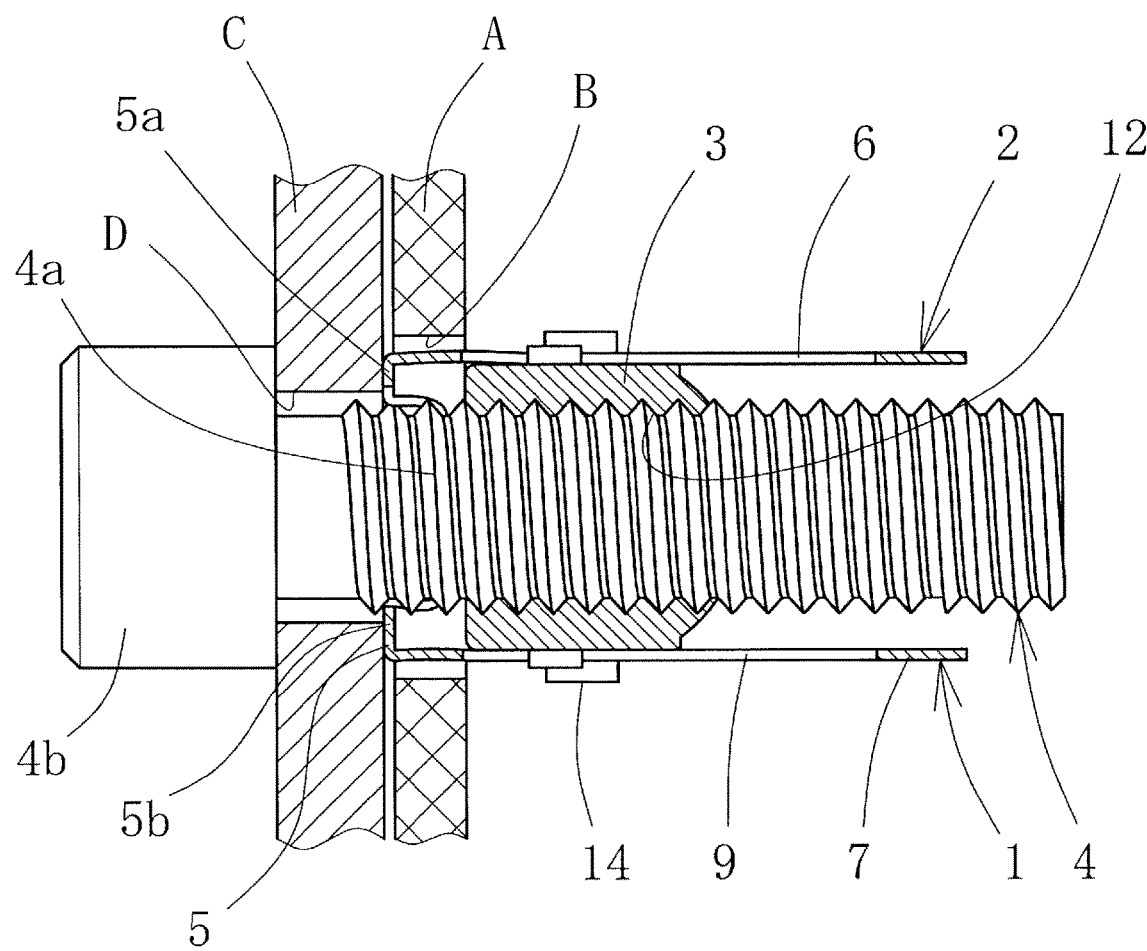
FIG. 7 is an enlarged view illustrating a state in which, from the state of FIG. 6, the threaded member is screwed into the pivot nut, thereby fastening an article to a wall.

FIG. 1 shows a fastener 1 embodying the present invention which includes a holder 2 formed from a metal plate and having a shape similar to the upper-case letter "U" with its corners more angular than the "real" U, and a pivot nut 3 pivotally retained by the holder 2. The fastener 1 further includes a separately provided threaded member 4, see FIG. 7, configured to be screwed into the pivot nut 3 to fix a member to be fixed.

The holder 2 is formed by stamping a thin, metal (such as stainless steel) plate to provide a substantially rectangular flange plate 5, and a pair of arm plates 6 and 7 integrally connected to the intermediate portions of the respective side edges of the flange plate 5 extending in the longitudinal direction of the flange plate 5; and then bending the arm plates 6 and 7 toward one side of the flange plate 5 so as to be opposed to each other such that the holder 2 has a shape similar to the letter U as seen from the front side of the holder 2. The flange plate 5 has, in its substantially central portion, a threaded member insertion hole 8 which is only slightly larger in diameter than the major diameter of the threaded member. Each of the arm plates 6 and 7 has an elongated hole 9 elongated in the longitudinal direction of the arm plate.

Figure 2A:
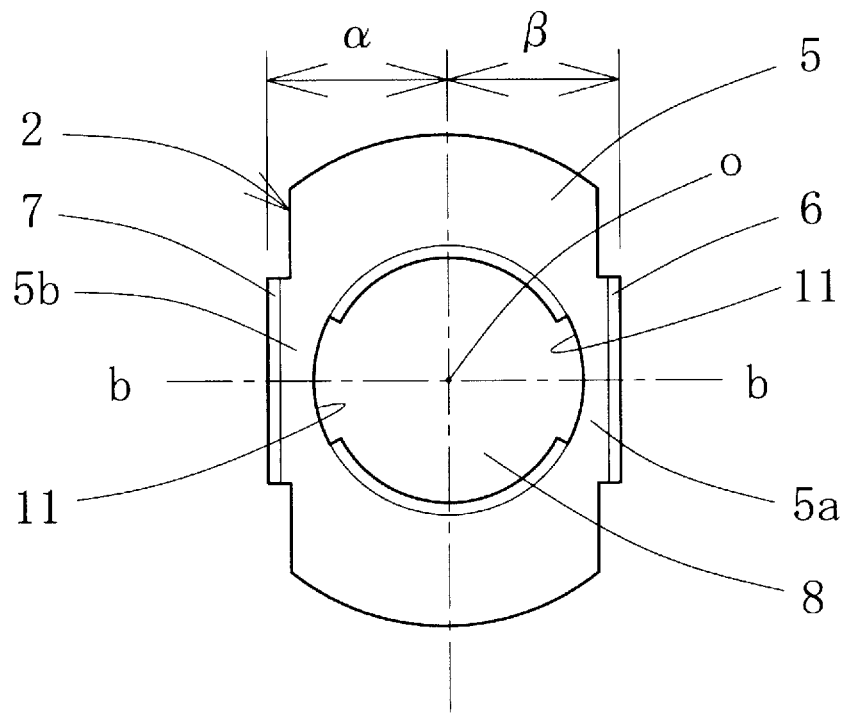
FIG. 2A is an enlarged plan view of the holder according to the present invention.
Figure 2B:
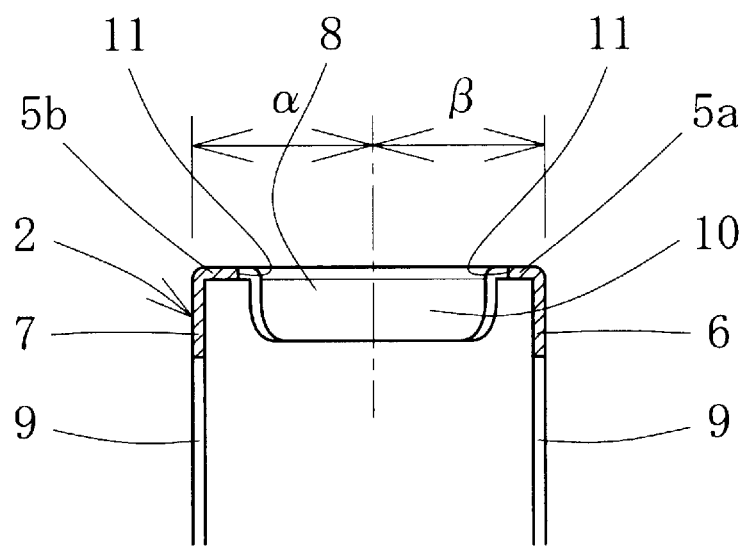
FIG. 2B is a vertical sectional front view taken along line b-b of FIG. 2A.

As seen in FIGS. 2A and 2B, the arm plates 6 and 7 are opposed to each other with the center axis O of the threaded member insertion hole 8 disposed therebetween such that the distances of the respective arm plates 6 and 7 from the center axis O differ from each other. In particular, the threaded member insertion hole 8 is located closer to the outer surface of the arm plate 6 than to the outer surface of the other arm plate 7, i.e., offset toward the arm plate 6. Stated differently, the flange plate 5 has a first plate portion (narrow portion) 5a between the threaded member insertion hole 8 and a first side edge of the flange plate 5 where arm plate 6 is attached, and has a second plate portion (wide portion) 5b between the threaded member insertion hole 8 and a second side edge of the flange plate 5 where the arm plate 7 is attached. As best illustrated in FIG. 2A, a width of the first plate portion 5a is less than a width of the second plate portion 5b ("width" being a dimension of the flange plate 5 in a direction between the arm plates 6 and 7).

In other words, the distance B from the center axis O of the threaded member insertion hole 8 to the arm plate 6 is smaller than the distance a from the center axis O to the other arm plate 7, which means that the threaded member insertion hole 8 is offset toward the arm plate 6, from the widthwise centerline of the flange plate 5, which extends in the longitudinal direction of the flange plate 5. This provides the flange plate 5 with a narrow portion 5a between the threaded member insertion hole 8 and the arm plate 6 that is narrower than a wide portion 5b of the flange plate 5 between the threaded member insertion hole 8 and the other arm plate 7.

The flange plate 5 has, on the backside thereof, i.e., its side facing the pivot nut 3, two arc-shaped peripheral walls 10 extending along the peripheral edge of the threaded member insertion hole 8. The peripheral walls 10 are separated from each other by cutouts 11 opposed to the respective arm plates. The threaded member insertion hole 8 has inner peripheral edge portions formed by the cutouts 11 and opposed to the respective arm plates 6 and 7 such that the thicknesses of the inner peripheral edge portions are the wall thickness of the (metal) flange plate 5.

The flange plate 5 has a wall thickness not more than the pitch of the thread 4a of the threaded member 4 to be screwed into the pivot nut 3 so that, when the threaded member 4 is screwed into the pivot nut 3, the thread bottom of the threaded member 4 reliably threadedly or otherwise engages the above-mentioned peripheral edges the threaded member insertion hole 8, which are formed by the cutouts 11.

The pivot nut 3 is a rectangular block having a sufficient thickness and formed by die casting, and has a threaded hole 12 extending therethrough in the thickness direction of the pivot nut 3 at the central portion of the pivot nut 3. The pivot nut 3 is further formed, at one end thereof, with a nut pivoting inclined surface 13 configured such that, when the nut pivoting inclined surface 13 is pushed by the threaded member 4, the pivot nut 3 pivots. Moreover, the pivot nut 3 includes two pivot shafts 14 at the central portions of the respective two sides of the pivot nut 3, and two protrusions 16 each on the respective side of the pivot arm 3 at a location separated from the corresponding pivot shaft 14 toward the other end of the pivot nut 3. The protrusions 16 are configured to cooperate with the peripheral edges of the arm plates 6 and 7, and protruding claws 15 of the arm plates 6 and 7 to restrict the pivot direction and pivot range of the pivot nut 3.

The pivot nut 3 is supported by the holder 2 such that, with the pivot nut 3 received between the arm plates 6 and 7 of the holder 2, and with the pivot shafts 14 fitted in the respective elongated holes 14, the pivot nut 3 is movable toward and away from the flange plate 5 in the direction of the elongated holes 9. The pivot nut 3 is further configured to be pivotable between a first position where, due to the protruding claws 15 at the distal ends of the arm plates 6 and 7 of the holder 2 being in engagement with the protrusions 16 of the pivot nut 3, the pivot nut 3 is positioned such that its longitudinal direction (axis) coincides with the longitudinal direction (axis) of the arm plates 6 and 7 so that the end of the nut pivoting inclined surface 13 coincides in position with the flange plate 5, and a second position where the longitudinal direction of the pivot nut 3 is parallel to the longitudinal direction of the flange plate 5 and perpendicular to the longitudinal direction of the arm plates 6 and 7, with the nut pivoting inclined surface 13 facing the flange plate 5 (position shown in FIG. 1).

When the pivot nut 3 is positioned parallel to the flange plate 5 while being supported at the distal ends of the elongated holes 9 through the pivot shafts 14, the threaded member insertion hole 8 of the flange plate 5 is offset relative to the threaded hole 12, by the distance equal to the distance by which the threaded member insertion hole 8 is offset toward the arm plate 6. However, since this distance is very small, the threaded member 4 can be inserted through the threaded member insertion hole 8, and then its distal end can be smoothly screwed into the threaded hole 12. When the threaded member 4 is screwed into the threaded hole 12, the threaded member 4 becomes coaxial with the threaded hole 12, so that the threaded member 4 moves the flange plate 5, by pushing the wide portion 5b of the flange plate 5, in the direction in which the threaded member insertion hole 8 becomes coaxial with the threaded hole 12.

For this purpose, the holder 2 is configured such that, with the nut 3 held between the arm plates 6 and 7, the arm plates 6 and 7 are inclinable, relative to the nut 3, in the direction in which the arm plates 6 and 7 are opposed to each other. In particular, the holder 2 is configured such that, due to the bendability and restoring elasticity of the arm plates 6 and 7, which are formed of thin metal plates, the flange plate 5 is movable, relative to the pivot nut 3, in the direction in which the center axis O of the threaded member insertion hole S coincides with the center axis of the threaded hole 12 formed in the pivot nut 3.

The fastener 1 according to the present invention, whose structural features have been described above, is used to fix an article to a wall arranged such that the area behind the wall is inaccessible to human hands, with the threaded member. For this purpose, the pivot nut 3 is first positioned, relative to the holder 2, such that, as shown in FIG. 3A, the longitudinal direction of the pivot nut 3 coincides with the longitudinal direction of the arm plates 6 and 7, with the pivot shafts 14 located at the distal ends of the elongated holes 9, and the end of the nut pivoting inclined surface 13 located close to the flange plate 5.

Figure 3A:
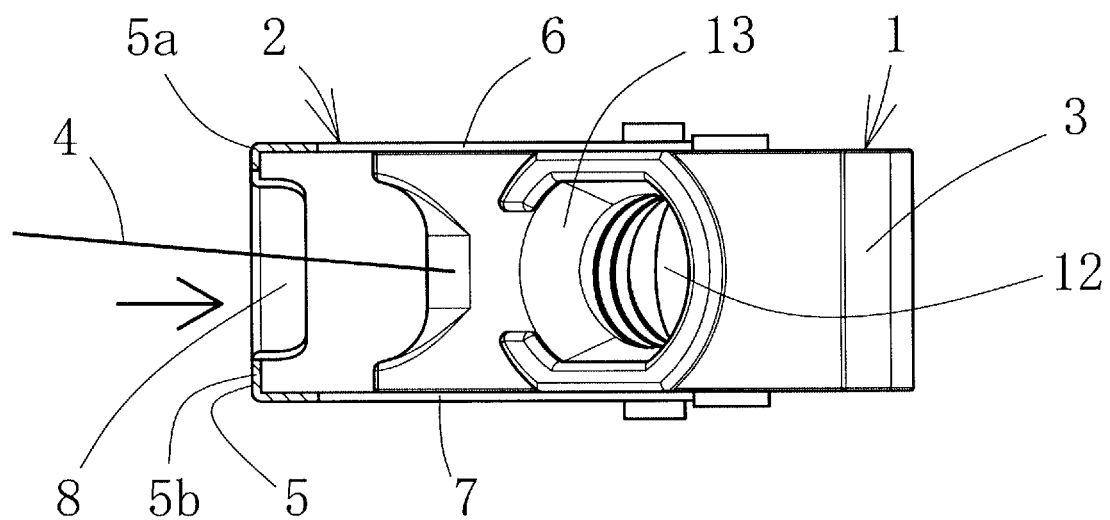
FIG. 3A is a schematic view illustrating an initial state in which a threaded member, which is depicted as a line and whose inclination angle is exaggerated, is inserted into the holder with the pivot nut positioned such that its longitudinal direction coincides with the longitudinal direction of the arm plates.
Figure 3B:
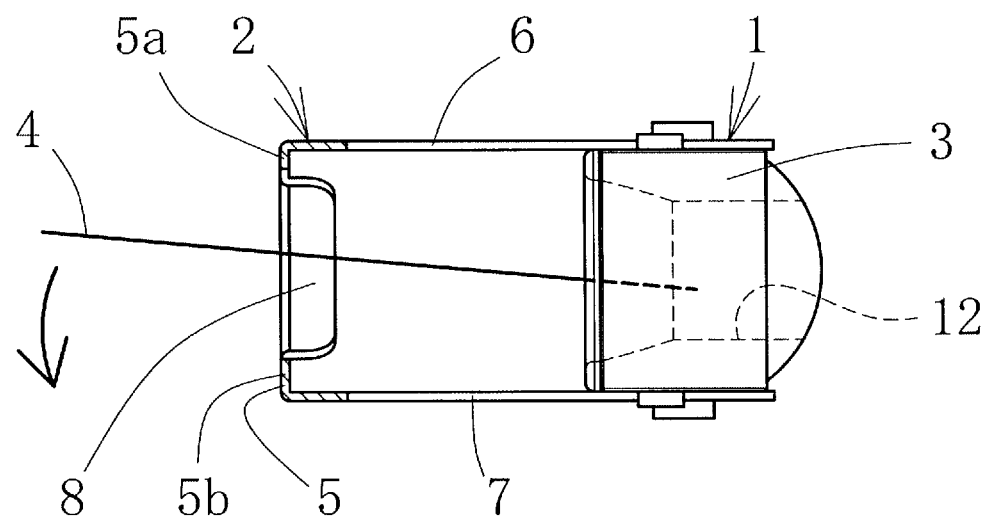
FIG. 3B is a schematic view illustrating a state in which the threaded member is further inserted into the holder from the state of FIG. 3A such that the pivot nut has been pushed by the threaded member and has pivoted until the pivot nut faces the flange plate, while being located at the distal ends of the arm plates.
Figure 3C:
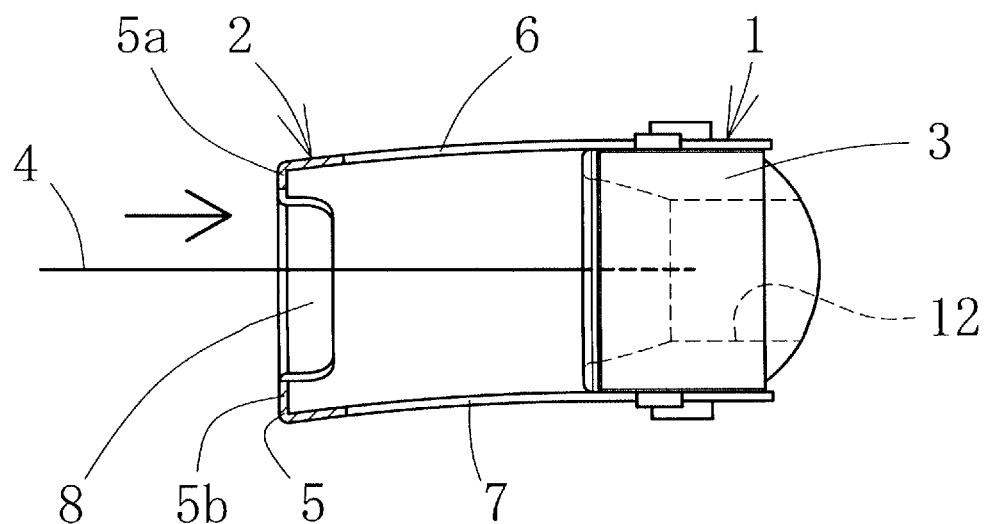
FIG. 3C is a schematic view illustrating a state in which, from the state of FIG. 3B, the threaded member is screwed into the pivot nut.
Figure 5:
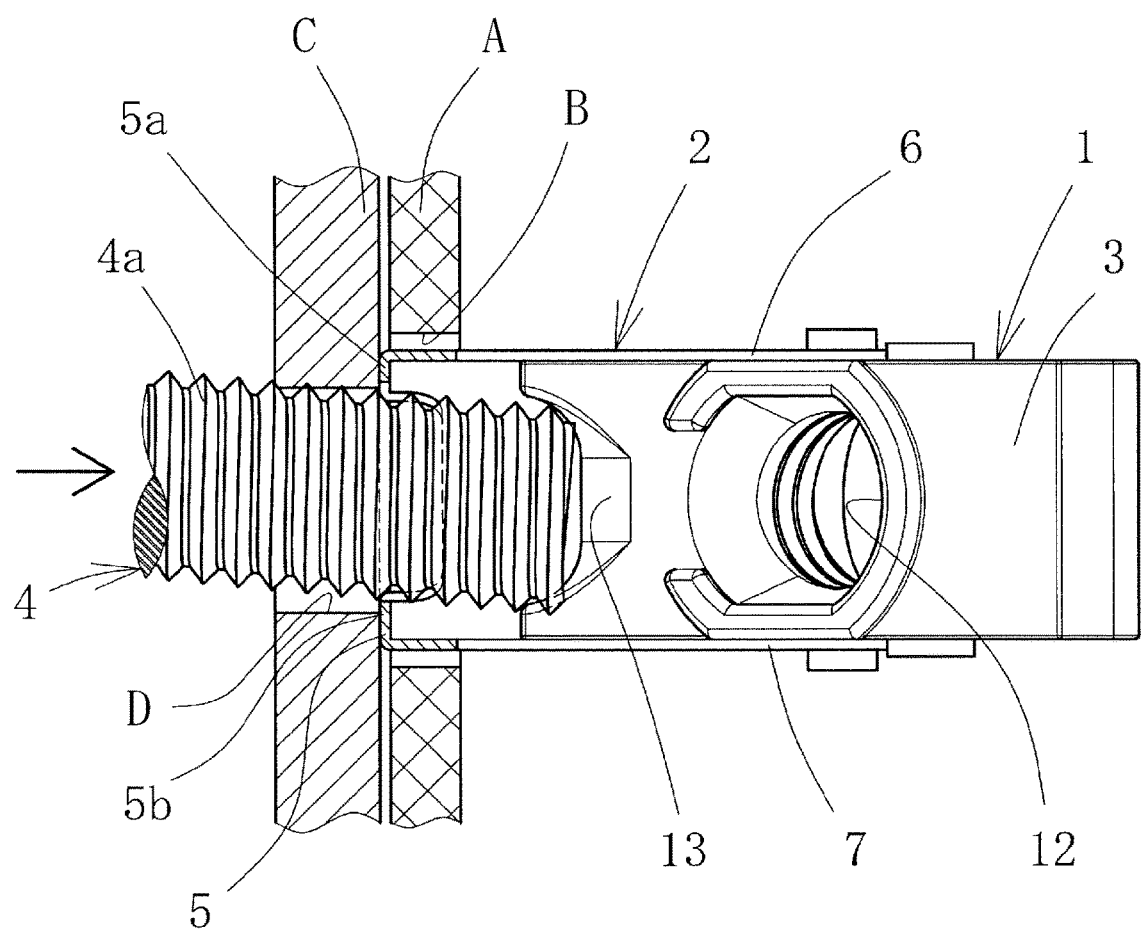
FIG. 5 is an enlarged view illustrating an initial state in which the threaded member is inserted into the holder with the pivot nut positioned such that its longitudinal direction coincides with the longitudinal direction of the arm plates.
Figure 6:
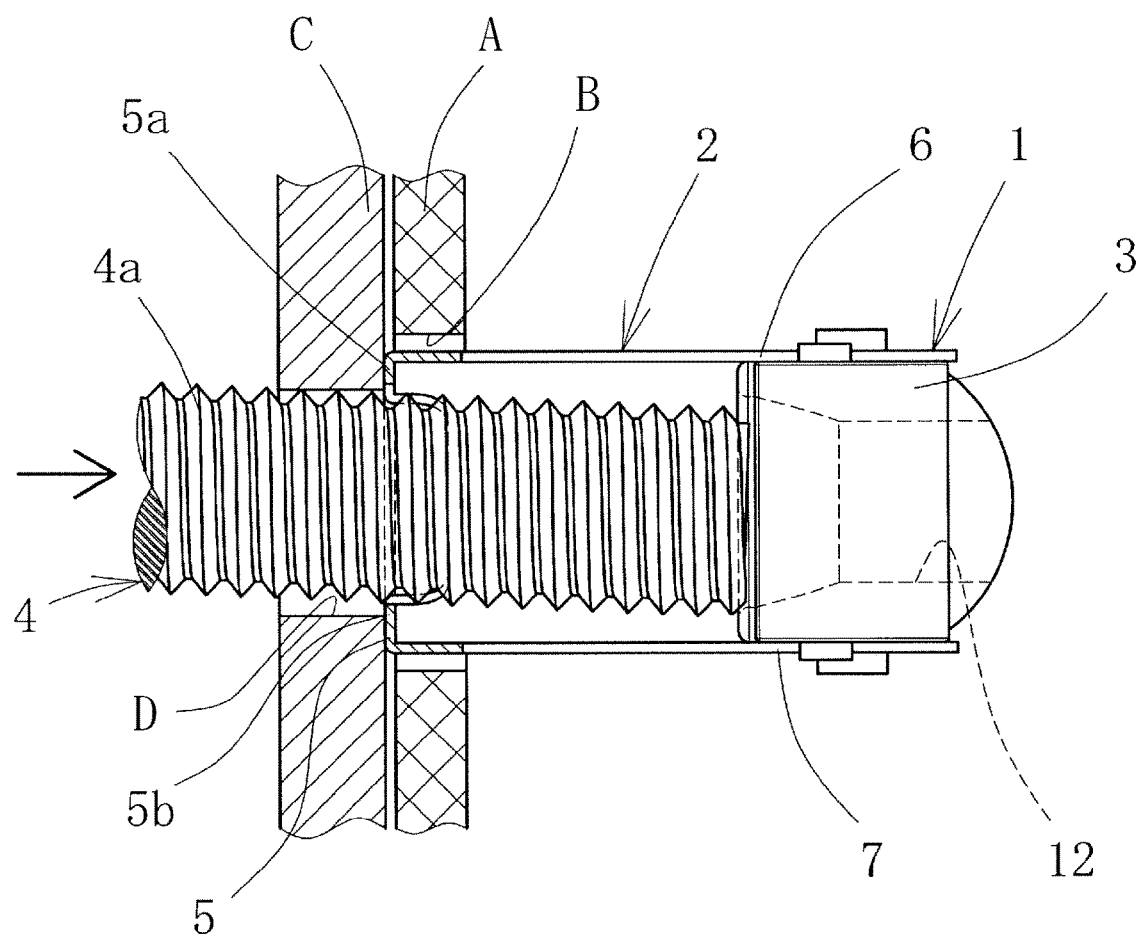
FIG. 6 is an enlarged view illustrating a state in which the threaded member is further inserted into the holder from the state of FIG. 5 such that the pivot nut has been pushed by the threaded member and has pivoted until the pivot nut faces the flange plate, while being located at the distal ends of the arm plates.

Referring to FIGS. 3A and 5, the pivot nut of the fastener 1, and then the arm plates 6 and 7, are inserted into a hole B formed in the wall A beforehand by drilling, until the pivot nut 3 is located at the back of the wall A with the flange plate 5 abutting the front surface of the wall A. In this state, the threaded member 4, which has been inserted through a mounting hole D formed in the article C to be fixed to the wall A, is inserted through the threaded member insertion hole 8 into the holder 2 until the distal end of the threaded member 4 comes into sliding contact with the nut pivoting inclined surface 13 of the pivot nut 3. Since the nut pivoting inclined surface 13 slopes upwardly from one end surface of the pivot nut 3 toward its center, when the surface 13 is pushed by the distal end of the threaded member 4, the pivot nut 3 pivots. When the pivot nut 3 pivots 90 degrees, and becomes perpendicular to the arm plates 6 and 7, the distal end of the threaded member 4 moves into the threaded hole 12 as shown in FIGS. 3C and 6.

Figure 4A:
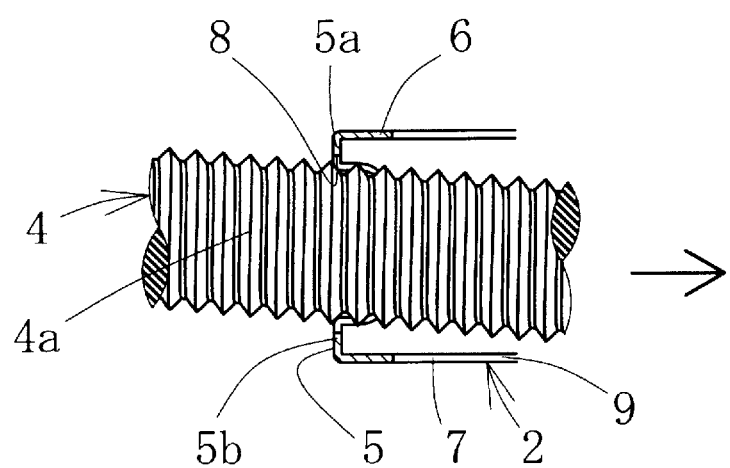
FIGS. 4A-4C are sectional views corresponding, respectively, to FIGS. 3A-3C, showing only the relationship between the threaded member insertion hole of the holder and the threaded member, with the inclination angle of the threaded member shown exaggerated.
Figure 4B:
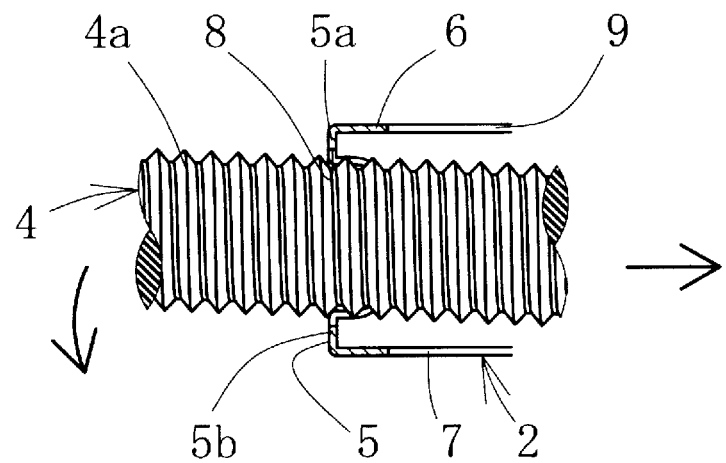
Figure 4C:
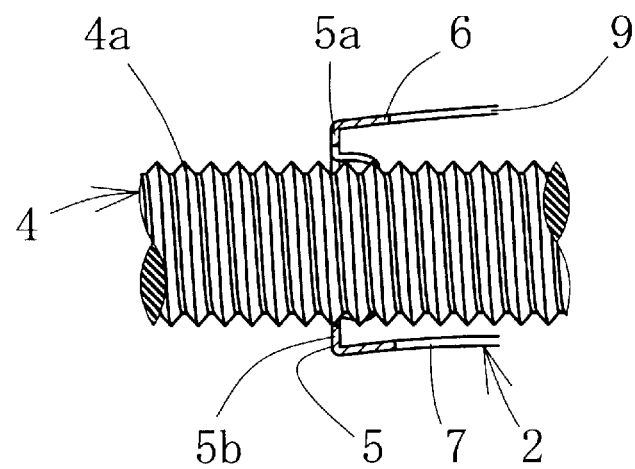

Since the threaded member insertion hole 8 of the flange plate 5 is offset relative to the threaded hole 12 by the distance equal to the distance by which the threaded member insertion hole 8 is offset toward the arm plate 6, the threaded member 4 is inserted while being inclined and offset toward the arm plate 6 relative to the holder 2. However, once the distal end of the threaded member 4 moves into the threaded hole 12, the threaded member 4 receives a force that tends to cause the threaded member 4 to become coaxial with the threaded hole 12, i.e., tends to pivot the threaded member 4 toward the other arm plate 7 until it becomes parallel to the arm plates 6 and 7, as shown in FIGS. 4B and 6. As a result, an intermediate portion of the thread 4a on the threaded member 4 engages the inner peripheral edge portion of the threaded member insertion hole 8 defined by one of the cutouts 11 separating the peripheral walls 10 from each other and opposed to the arm plate 7. This reduces the pushing force applied to the pivot nut 3 by the threaded member 4, and prevents the pivot nut 3 from being subjected to excessive pushing force.

Although the pivot nut 3 is held with slight play by the holder 2, during the initial stage until the threaded member 4 comes into threaded engagement in the threaded hole 12, the holder 2 reduces the pushing force applied to the pivot nut 3 from the threaded member 4, thereby preventing wobbling movements of the pivot nut 3. The holder 2 also prevents cracking of the pivot nut 3 even if an operator applies a large pushing force to the threaded member because the holder 2 prevents the pushing force from being directly applied to the pivot nut 3.

The force that tends to move the threaded member 4 toward the arm plate 7 until it becomes parallel to the arm plate 7 causes the threaded member 4 to engage the above-mentioned inner peripheral edge of the threaded member insertion hole 8, and to push and move the flange plate 5 in the direction in which the threaded member 4 becomes parallel to the arm plates 6 and 7. As a result, as shown in FIG. 3C, the flange plate 5 of the holder 2 slides on the surface of the wall A while deflecting the arm plates 6 and 7, so that the center axis of the threaded member insertion hole 8 of the flange plate 5 approaches the center axis of the threaded hole 12 of the pivot nut 3.

When, after the distal end of the threaded member 4 moves into the threaded hole 12, the threaded member 4 is turned in the direction in which the threaded member 4 is screwed into the threaded hole 12. Once the head 4b of the threaded member 4, which has now been screwed into the threaded hole 12, abuts the article C, the threaded member 4 moves the pivot nut 3 toward the flange plate 5. Once the pivot nut 3 abuts the back surface of the wall A, the pivot nut 3 and the head 4b of the threaded member 4 tightly sandwich the wall A and the article B therebetween, thereby fixing the article B to the wall A.

Since, when the threaded member 4 is screwed into the threaded hole 12, the thread 4a of threaded member 4 threadedly engages the above-mentioned inner peripheral edge of the threaded member insertion hole 8, the pushing force applied to the threaded member 4 when it is screwed into the threaded hole 12 is received by the flange plate 5, and thus not directly applied to the threaded hole 12. This effectively prevents breakage of the thread 4a on the threaded hole 12 due to excessive pushing force applied to the threaded member 4.

With the threaded member 4 tightened, the pivot nut 3 and the threaded member 4 are joined together by the threaded engagement of the threaded hole 12 and the thread 4a. Simultaneously, the threaded member 4 and the flange plate 5 are joined together by the threaded engagement of the thread 4a with the inner peripheral edge of the threaded member insertion hole. Thus, the threaded member 4, the pivot nut 3, and the holder 2 are tightly joined together without looseness therebetween.

What is claimed is:
1. A holder of a fastener, the holder comprising:
a flange plate having a threaded member insertion hole having a center axis, the flange plate further having a first side edge, a second side edge opposite the first side edge, a first end, a second end opposite the first end, a first plate portion between the threaded member insertion hole and the first side edge of the flange plate, and a second plate portion between the threaded member insertion hole and the second side edge of the flange plate; and
a pair of arm plates each extending from a respective one of the first side edge and the second side edge of the flange plate, the arm plates being opposed to each other with the center axis of the threaded member insertion hole disposed between the arm plates;

wherein the flange plate and the pair of arm plates are configured such that an entirety of the holder is U-shaped when viewed from one of the first end and the second end;

wherein the holder is configured to constitute the fastener in cooperation with a pivot nut to be retained by the holder so as to be pivotable and movable toward and away from the flange plate, between the arm plates; and wherein a width of the first plate portion between the threaded member insertion hole and the first side edge of the flange plate is unequal to a width of the second plate portion between the threaded member insertion hole and the second side edge of the flange plate such that a distance between the center axis of the threaded member insertion hole and a first one of the arm plates is different from a distance between the center axis of the threaded member insertion hole and a second one of the arm plates.

2. The holder of claim 1, wherein the arm plates are bent from the flange plate toward a back surface of the flange plate, wherein the flange plate is a metal plate, wherein the flange plate has peripheral walls disposed on the back surface of the flange plate to extending along a portion of a peripheral edge of the threaded member insertion hole, the peripheral walls being separated from each other by a pair of bare edge sections of the peripheral edge of the threaded member insertion hole located closest to the respective arm plates, and wherein each of the bare edge sections of the peripheral edge of the threaded member insertion hole has a thickness equal to a thickness of the flange plate.

3. The holder of claim 1, wherein each of the arm plates has an elongated hole therein for engaging a respective pivot shaft of the pivot nut.

4. A fastener comprising:
a holder including:
a flange plate having a threaded member insertion hole having a center axis; and
a pair of arm plates each extending from a respective one of a first side edge and a second side edge of the flange plate, the arm plates being opposed to each other with the center axis of the threaded member insertion hole disposed between the arm plates, wherein a distance between the center axis of the threaded member insertion hole and a first one of the arm plates is different from a distance between the center axis of the threaded member insertion hole and a second one of the arm plates; and
a pivot nut retained by the holder such that the pivot nut is pivotable relative to the holder between a first position, whereat a longitudinal axis of the pivot nut is parallel to a longitudinal axis of each of the arm plates, and a second position, whereat the longitudinal axis of the pivot nut is perpendicular to the longitudinal axis of each of the arm plates, and such that the pivot nut is movable toward and away from the flange plate between the arm plates.

5. The fastener of claim 4, wherein the arm plates are bent from the flange plate toward a back surface of the flange plate, wherein the flange plate is a metal plate, wherein the flange plate has peripheral walls disposed on the back surface of the flange plate t-e extending along a portion of a peripheral edge of the threaded member insertion hole, the peripheral walls being separated from each other by a pair of bare edge sections of the peripheral edge of the threaded member insertion hole located closest to the respective arm plates, and wherein each of the bare edge sections of the peripheral edge of the threaded member insertion hole has a thickness equal to a thickness of the flange plate.

6. The fastener of claim 5, wherein the pivot nut has a threaded hole having a center axis, and wherein the holder is configured such that the arm plates are inclinable relative to the pivot nut in a direction in which the arm plates are opposed to each other such that the flange plate is movable in a direction in which the center axis of the threaded member insertion hole of the flange plate coincides with the center axis of the threaded hole of the pivot nut.

7. The fastener of claim 6, further comprising a threaded member having a thread, the threaded member being configured to be screwed into the pivot nut, wherein the flange plate has a thickness not more than a pitch of the thread of the threaded member.

8. The fastener of claim 4, wherein the pivot nut has a threaded hole having a center axis, and wherein the holder is configured such that the arm plates are inclinable relative to the pivot nut in a direction in which the arm plates are opposed to each other such that the flange plate is movable in a direction in which the center axis of the threaded member insertion hole of the flange plate coincides with the center axis of the threaded hole of the pivot nut.

9. The fastener of claim 4, further comprising a threaded member having a thread, the threaded member being configured to be screwed into the pivot nut, wherein the flange plate is a metal plate having a thickness not more than a pitch of the thread of the threaded member.

10. The fastener of claim 4, wherein the pivot nut has a pair of pivot shafts on opposite sides thereof, and each of the arm plates has an elongated hole therein engaging a respective one of the pivot shafts of the pivot nut to allow the pivot nut to pivot relative to the holder and to guide the pivot shafts to allow the pivot nut to move toward and away from the flange plate.

11. The fastener of claim 4, further comprising a threaded member having a thread, wherein the pivot nut has a nut pivoting inclined surface for engaging a distal end of the threaded member when the pivot nut is oriented such that the longitudinal axis of the pivot nut is parallel to the longitudinal axis of each of the arm plates.

* * * * *